(12) United States Patent
Evans

(10) Patent No.: US 6,784,833 B1
(45) Date of Patent: Aug. 31, 2004

(54) PERSONAL SURVEILLANCE SYSTEM WITH LOCATING CAPABILITIES

(75) Inventor: James P. Evans, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/371,911

(22) Filed: Feb. 21, 2003

(51) Int. Cl.[7] ............................. G01S 5/02; H04B 7/185
(52) U.S. Cl. ............................... 342/357.14; 342/357.09
(58) Field of Search .................... 342/357.14, 357.1, 342/357.09; 701/217, 220

(56) References Cited

U.S. PATENT DOCUMENTS

| | | | |
|---|---|---|---|
| 4,157,540 A | 6/1979 | Oros | |
| 4,605,959 A | 8/1986 | Colbaugh | |
| 5,572,401 A | 11/1996 | Carroll | |
| 5,594,498 A | 1/1997 | Fraley | |
| 5,731,757 A | * 3/1998 | Layson, Jr. | ............... 340/573 |
| 5,793,419 A | 8/1998 | Fraley | |
| 5,799,082 A | 8/1998 | Murphy et al. | |
| 5,906,655 A | 5/1999 | Fan | |
| 5,925,441 A | 7/1999 | Blauer et al. | |
| 6,091,546 A | 7/2000 | Spitzer | |
| 6,137,407 A | 10/2000 | Akagawa et al. | |
| 6,167,413 A | 12/2000 | Daley, III | |
| 6,215,498 B1 | 4/2001 | Filo et al. | |
| 6,249,252 B1 | 6/2001 | Dupray | |
| 6,252,544 B1 | 6/2001 | Hoffberg | |
| 6,266,995 B1 | 7/2001 | Scott | |
| 6,292,213 B1 | 9/2001 | Jones | |
| 6,307,475 B1 | 10/2001 | Kelley | |
| 6,307,526 B1 | 10/2001 | Mann | |
| 6,353,408 B1 | 3/2002 | Whight | |
| 6,362,778 B2 | * 3/2002 | Neher | ............... 342/357.07 |
| 6,408,245 B1 | 6/2002 | An et al. | |
| 6,480,152 B2 | 11/2002 | Lin et al. | |
| 2001/0034210 A1 | 10/2001 | Nir et al. | |
| 2002/0065100 A1 | 5/2002 | Nir et al. | |

* cited by examiner

Primary Examiner—Theodore M. Blum
(74) Attorney, Agent, or Firm—Dicke, Billig & Czaja, P.A.

(57) ABSTRACT

A personal surveillance system configured to be worn by an individual includes a communication system configured to record communication files, a locating system configured to determine a location of the personal surveillance system, and a transmitter configured to send the communication files and the location of the personal surveillance system to a remote monitoring station. The locating system includes a satellite system interface configured to determine the location of the personal surveillance system and an alternate positioning system configured to determine the location of the personal surveillance system in at least one situation where the satellite system interface cannot determine the location of the personal surveillance system.

24 Claims, 3 Drawing Sheets

US 6,784,833 B1

PERSONAL SURVEILLANCE SYSTEM WITH LOCATING CAPABILITIES

THE FIELD OF THE INVENTION

The present invention generally relates to a surveillance system, and more particularly to a personal surveillance system with audio, video, and locating capabilities.

BACKGROUND OF THE INVENTION

Military, paramilitary, and even civilian individuals often enter hazardous environments. Whether the dangers of the environment are caused by battle, emergency, fire, unpredictable and/or dangerous people, etc., it is advantageous to allow a remote third party to monitor the environment and people encountered by an individual. In particular, it may be helpful to have a remote third party witness a traffic stop, an arrest, a military encounter, an assault, or other encounter to ensure safety and/or to verify an individual's account of the encounter.

As such, conventional surveillance systems have developed to perceive and capture audio and video files of the encountered circumstances and environment. Such systems may record the audio and video files collected to a storage device for later viewing and listening. Other systems additionally or alternatively transmit the collected files to a relatively remote monitor. The monitor may simply view and listen to the information to ascertain the true danger of the environment. The monitor may additionally be equipped to communicate information back to the individual, particularly when the surveillance system is configured to be worn on the individual's person.

Typically, the monitor is equipped to provide or send additional aid to an individual if it is ascertained that the environment or circumstances surrounding the individual so require. However, in order to send aid to an individual, the location of that individual must first be ascertained. In some instances, such as in a planned cooperative sting or mission, the location of the individual is known by the monitor prior to introduction of the individual to the hazardous environment. In other cases, the individual's location may be determined by the audio and video files recorded and/or transmitted. However, oftentimes audio and video files are insufficient to allow the monitor to determine the precise or even the approximate location of the individual, thereby, leaving the monitor without the means to send aid to the individual in an increasingly hazardous or even perilous environment or situation. Therefore, there is need for an improved surveillance system which can be employed by a monitor and/or third party to more easily ascertain the location of an individual in a hazardous environment in a wide variety of situations.

SUMMARY OF THE INVENTION

One aspect of the present invention provides a personal surveillance system configured to be worn by an individual. The personal surveillance system includes a communication system configured to record communication files, a locating system configured to determine a location of the personal surveillance system, and a transmitter configured to send the communication files and the location of the personal surveillance system to a remote monitoring station. The locating system includes a satellite system interface configured to determine the location of the personal surveillance system and an alternate positioning system configured to determine the location of the personal surveillance system in at least one situation where the satellite system interface cannot determine the location of the personal surveillance system.

Another aspect of the present invention provides a surveillance and monitoring system including a personal surveillance system and a remote monitoring system. The personal surveillance system includes a communication system configured to record communication files, a locating system configured to determine the location of the personal surveillance system, and a transmitter configured to send the communication files and the location of the personal surveillance system. The locating system includes a satellite system interface and an alternate positioning system. The satellite system interface is configured to determine the location of the personal surveillance system. The alternate positioning system is configured to determine the location of the personal surveillance system in at least one situation where the satellite system interface cannot determine the location of the personal surveillance system. The remote monitoring station is configured to receive and review the communication files and the location transmitted from the personal surveillance system.

Yet, another aspect of the present invention provides a method of surveillance including collecting communication files with a personal surveillance system, determining a location of the personal surveillance system, and sending the communication files and the determined location from the personal surveillance system to a remote monitoring station. Determining the location of the personal surveillance system includes determining the location of the personal surveillance system with a satellite system interface if the satellite system interface can determine the location of the persona surveillance system and determining the location of the personal surveillance system with an alternate positioning system if the satellite system interface cannot determine the location of the personal surveillance system.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
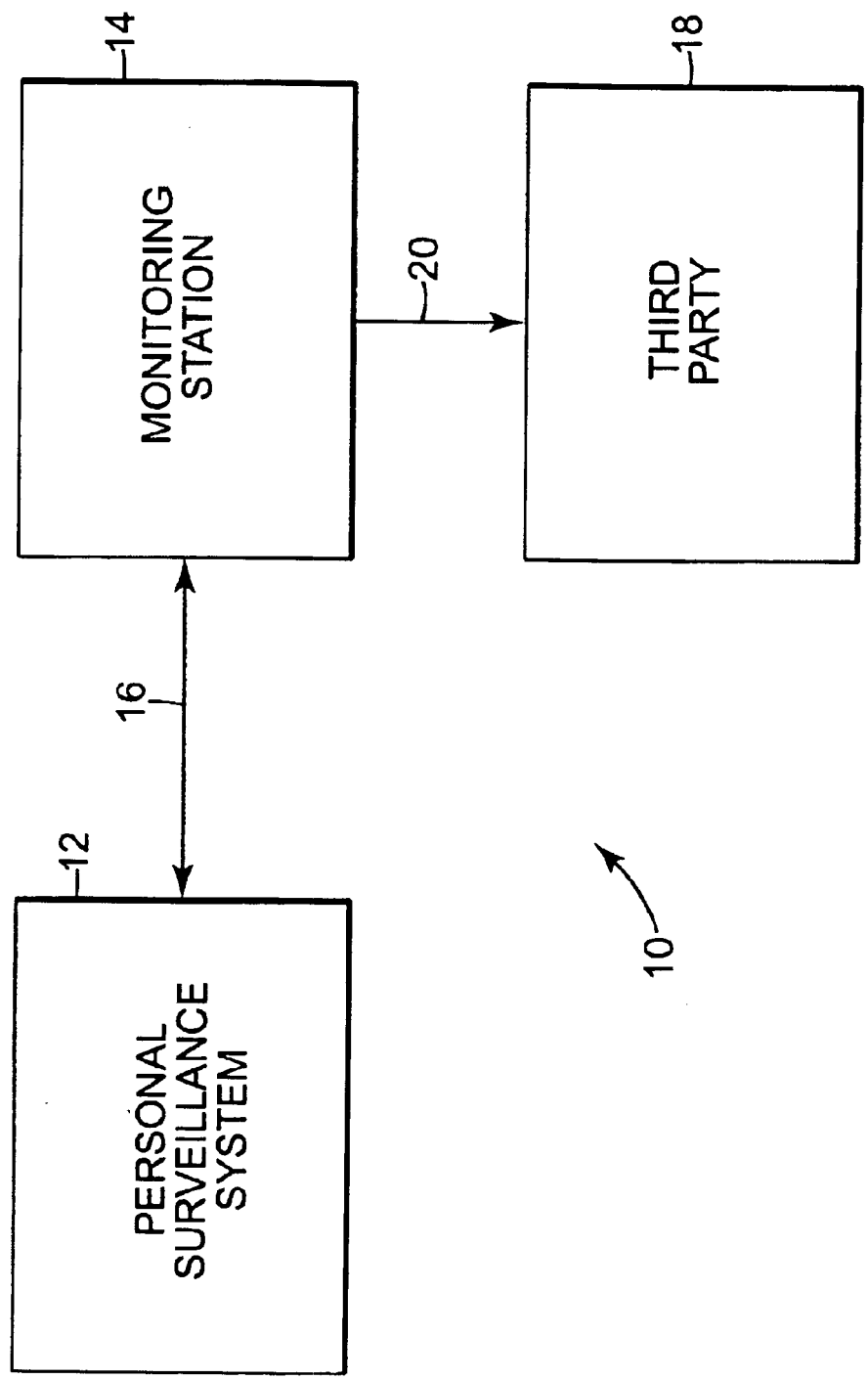
FIG. 1 is a block diagram illustrating one embodiment of a surveillance and monitoring system according to the present invention.

One embodiment of a surveillance and monitoring system according to the present invention is generally illustrated at 10 in FIG. 1. Surveillance and monitoring system 10 includes a personal surveillance system 12 and a monitoring station 12. Personal surveillance system 12 is worn or carried by an individual and collects information regarding the location and the environment of the individual wearing personal surveillance system 10. Monitoring station 14 is remotely located relative to personal surveillance system 10. Personal surveillance system 12 transmits the information regarding the location and the environment of the individual to monitoring station 14 via a wireless communication path 16. In one embodiment the information is in video, audio, and/or script format. Monitoring station 14 monitors, reviews, and interprets the incoming information to determine, among other things, whether the individual wearing the personal surveillance system 12 is in need of assistance. In one embodiment, monitoring station 14 is further able to send a response to personal surveillance system 12 via wireless communication path 16. In one embodiment, the response is sent in audio format.

In one embodiment, monitoring station 14 includes hardware and software to receive and monitor the information from personal surveillance system 12 via wireless communication path 16. In one embodiment, monitoring station is operated by a security company such as Brinks, ADT, etc. Wireless communication path 16 between personal surveillance system 12 and monitoring station 14 includes one or more known communication protocols such as Wireless Application Protocol (WAP), Bluetooth, Infrared (IrDA), and/or other communication and application protocols known to those skilled in the art. Personal surveillance system 12 and monitoring station 14 each include communication hardware and software known in the art for implementing these protocols. In another embodiment, wireless communication path 16 includes communication means such as a cellular network or a wireless link to a network (e.g., an intranet or internet network, such as the Internet).

In one embodiment, surveillance and monitoring system 10 further includes a third party 18 remotely located with respect to personal surveillance system 12 and monitoring station 14. Monitoring station 14 communicates with third party 18 via communication link 20. More particularly, monitoring station 14 communicates with third party 18 to request that assistance be sent to personal surveillance system 12. Accordingly, monitoring station 14 communicates some or all of the information received from personal surveillance system 12 supplemented by the interpretation of the monitoring station 14 to third party 18. In turn, third party 18 provides assistance at the location of personal surveillance system 12 as indicated in the information indirectly received from personal surveillance system 12. In one embodiment, communication link 20 is similar to wireless communication path 16. In another embodiment, communication link 20 is a telephone line or a cable connection making use of a network, such as an intranet or an internet network.

In one embodiment, third party 18 is a 911 emergency center, a police dispatch station, a fireman dispatch station, a hospital, an ambulance dispatch station, a military dispatch station, or other station or center capable of sending assistance. In another embodiment, third party 18 is a family member or acquaintance of the individual wearing the personal surveillance system 12. In one embodiment, monitoring station 14 is connected to a plurality of third parties (not shown). As such, third party 18 provides assistance including one or more of physical protection, crime prevention, crime intervention, rescue, medical aid, personnel back-up, moral support, etc.

Figure 2:
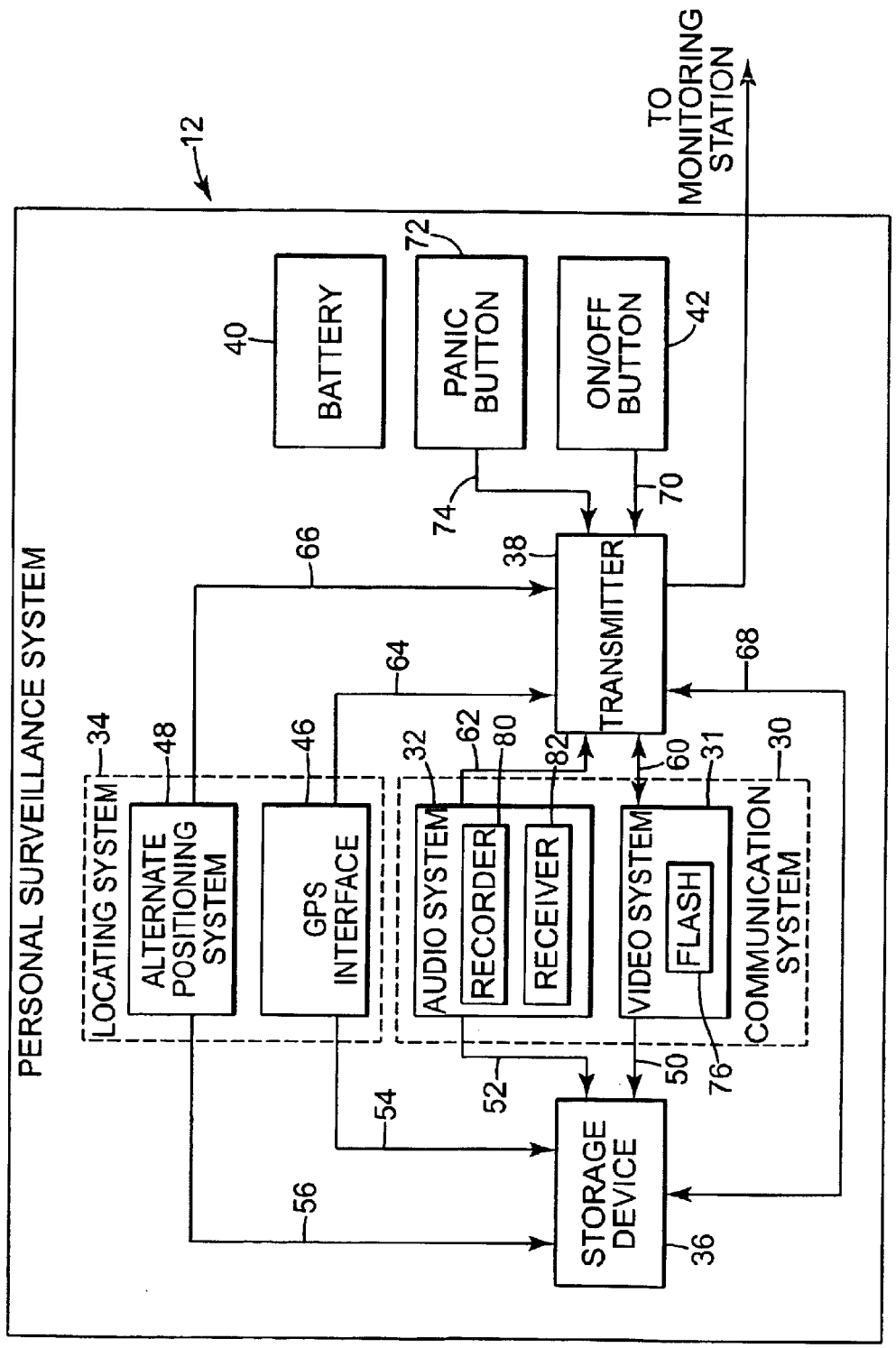
FIG. 2 is a block diagram illustrating one embodiment of a personal surveillance system according to the present invention.

FIG. 2 illustrates one embodiment of personal surveillance system 12 according to the present invention. Personal surveillance system 12 includes a communication system 30, a locating system 34, a storage device 36, a transmitter 38, a battery 40 and an on/off button 42. The storage device may be a hard drive, another type of electronic storage device, or any other suitable storage device. Communication system 30 and locating system 34 each collect information regarding the environment and the location of personal surveillance system 12 and, consequently, of an individual 44 (illustrated in FIG. 3) wearing the personal surveillance system 12 in at least one of video, audio, and script formats. In one embodiment, the system within body pack 90 is embedded into a bulletproof vest or garment.

In particular, in one embodiment communication system 30 includes a video system 31 and an audio system 32. Video system 31 collects video files of the environment of individual 44, and audio system 32 collects audio files from the environment of individual 44. In one embodiment, locating system 34 includes a satellite system interface 46 and an alternate positioning system 48 to determine the location of individual 44. Video system 31, audio system 32, satellite system interface 46, and alternate positioning system 48 are connected to storage device 36 via communication links 50, 52, 54, and 56, respectively. As such, video system 31, audio system 32, satellite system interface 46, and alternate positioning system 48 can relay collected information to storage device 36 for storage. Similarly, video system 31, audio system 32, satellite system interface 46, and alternate positioning system 48 are connected to transmitter 38 via communication links 60, 62, 64, and 66, respectively. Transmitter 38 is adapted to forward audio, video, and script files received via links 60, 62, 64, and 66 to monitoring station 14 and, in one embodiment, to receive files from monitoring station 14, via wireless communication path 16.

In addition, storage device 36 and transmitter 38 are coupled via communication device 68, such that transmitter 38 can request stored files directly from storage device 36 and/or storage device 36 can send stored files directly to transmitter 38. On/Off button 42 is coupled to transmitter 38 via communication link 70. On/Off button 42 is accessible by the individual 44, who can activate or deactivate communication between transmitter 38 and monitoring station 14 by interacting with button 42. Although described here as a button, in other embodiments, on/off button 42 is a switch, lever, or any other type of indicator known in the art.

Battery 40 provides power to the entire personal surveillance system 12. Although not shown for clarity, battery 40 is directly or indirectly electronically connected and provides power to video system 31, audio system 32, satellite system interface 46, alternate positioning system 48, storage device 36, and transmitter 38. In one embodiment, battery 40 is an integrated battery package including either a seal lead-acid battery, a nickel-cadmium battery, or any other battery known in the art and capable of supplying sufficient voltage to personal surveillance system 12.

In one embodiment, personal surveillance system 12 further includes a panic button 72 coupled to transmitter 38 via communication link 74. Panic button 72 is also accessible by the individual 44 and can be activated by individual 44 to place monitoring station 14 on heightened alert regarding review of the environment and location of individual 44. As such, panic button 72 is a button, a switch, or a lever, or other indicating device that can be activated or deactivated by the individual 44 at will. For example, when individual 44 becomes increasingly wary of the hazardous environment in which he/she is surrounded, he/she can activate panic button 72 placing monitoring station 14 on heightened alert. Once on heightened alert, monitoring station 14 can review the audio, video, and/or script files incoming from the individual's personal surveillance system 12 with extra care and caution to determine whether or not individual 44 is in need of assistance. In one embodiment, upon activation of panic button 72, monitoring station 14 immediately sends assistance or contacts third party 18 to send assistance. In one embodiment, communication link 74 is an electrical connection, a wireless connection, or other connection as is known in the art to be capable of communication activation of panic button 72 to transmitter 38.

Video system 31 includes a video recorder or camera unit capable of recording digital video files of the environment and of being worn or carried by individual 44. In one embodiments, video recorder is worn on a lapel pin, on a headset, a pair of glasses, a body strap, on a collar, a pendant, or any other object facilitating attachment to the body of individual 44. In one embodiment, video system 31 includes any digital camera commercially available and capable of being worn or carried by individual 44. In one embodiment, the camera is capable of being worn or carried by individual 44 in a substantially concealed manner. In one embodiment, there are both forward-facing and rear-facing cameras. In one embodiment, there are four or more cameras integrated to achieve 360-degree coverage, such as by mounting four or more cameras on a collar of individual 44.

In one embodiment, video recorder is a video interest recorder or a micro-video camera. An example micro-video camera utilizes a digital signal processing (DSP) technology and a charge-coupled devices (CCD) format. In one embodiment, video system 31 is capable of recording both high-quality and low-quality images or recording high-quality images which can be compressed into low-quality images. In such a case, the high-quality images are sent via communication link 50 to be stored by storage device 36, and low-quality streaming images are sent via communication link 60 to transmitter 38 for forwarding to monitoring station 14. In one embodiment, low-quality images have approximately a 100×100 resolution, and high-quality images have approximately a 400×400 resolution. In one embodiment, low quality images have approximately a 200×200 resolution, and high quality images have approximately a 2048×2048 resolution. In one embodiment, the video camera includes infrared imaging for optimum night-time operation. In one embodiment, video files are sent to storage device 36 and transmitter 38 at a two-second frame rate.

Video system 31 optionally includes a flash 76. Flash 76 can facilitate recording video files in dark areas and can be continuously on while personal surveillance system 12 is in use or, alternatively, can be used on an case by case basis. Flash 76 can also be used on an instant by instant basis to distract an intruder or perpetrator.

Figure 3:
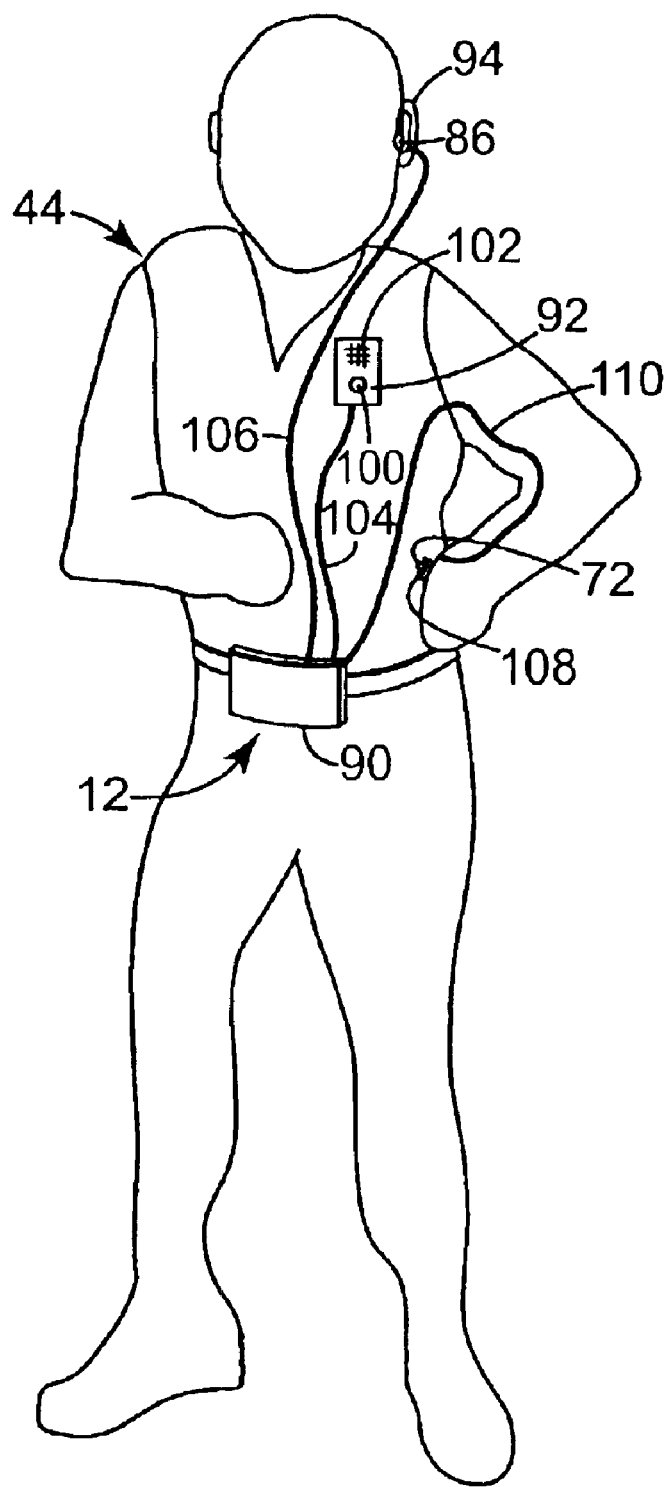
FIG. 3 is a schematic illustration of one embodiment of the personal surveillance system illustrated in FIG. 2.

One embodiment of audio system includes a recorder 80 and an optional receiver 82. Recorder 80 is adapted to capture or record the audio aspects of the environment surrounding personal surveillance system 12 and, thereby, individual 44. In one embodiment, recorder 80 includes a microphone 102 (one embodiment of which is illustrated in FIG. 3) worn or carried by individual 44 to facilitate detection and recording of audio files. In one embodiment, the microphone is worn on a lapel pin, a headset, a pair of glasses, a body strap, or any other object facilitating attachment to the body of individual 44. In one embodiment, recorder 80 includes any digital audio recorder commercially available and capable of being worn or carried by individual 44. In one embodiment, the recorder 80 is capable of being worn or carried by individual 44 in a substantially concealed manner. Audio files captured by recorder 80 are sent to storage device 36 and transmitter 38 for storage and forward to monitoring station 14, respectively.

Optional receiver 82 is capable of receiving audio transmissions from monitoring station 14 via wireless communication link 16, transmitter 38, and communication link 62 and synthesizing the audio transmission for play to individual 44. As such, receiver 82 includes a speaker 86 (one embodiment of which is illustrated in FIG. 3) to facilitate playing the audio transmission for individual. In one embodiment, the speaker is worn on an ear piece, a lapel pin, a headset, a pair of glasses, a body strap, or any other object facilitating attachment to the body of individual 44. In one embodiment, audio system 32 includes any receiver 82 with speaker commercially available and capable of being worn or carried by individual 44. In one embodiment, the receiver 82 and speaker 86 are capable of being worn or carried by individual 44 in a substantially concealed manner.

Although video system 31 and audio system 32 can be formed in a independent manner, as described above, video system 31 and audio system 32 can be partially or fully integrated. In one embodiment, recorder 32 is formed as part of video system 31. In particular, in one embodiment, the camera of video system 31 includes a microphone, and the camera is capable of recording both video and audio files or audio/video files and forwarding both video and audio files or the audio/video files to storage device 36 and transmitter 38.

In one embodiment, satellite system interface 46 interacts with a global positioning system (GPS). GPS is a satellite-based navigational and location system which aids in determining the location of individuals, objects, or landmarks nearly anywhere on Earth. GPS was developed by the United States Defense Department as part of a satellite navigation system and includes up to twenty-four satellites. Four satellites are spaced around each of six circular orbits, which are inclined at an angle of fifty-five degrees relative to the Earth's equator and are spaced around the Earth at approximately sixty degree intervals. The satellites move relative to time on Earth below them. As such, four or more satellites will theoretically have line of sight access to most points on the Earth's surface. If an object has line of sight access with at least three satellites at one time, GPS can be used to ascertain the position of the object anywhere on Earth.

Accordingly, satellite system interface 46 interacts with the GPS satellites to determine the location of personal surveillance system 12, and thereby individual 44. As such, satellite system interface 46 includes hardware and/or software capable of converting signals from the GPS satellites into location information. Satellite system interface 46 further sends the location information to storage device 36 via communication link 5, transmitter 38, and communication link 64. In one embodiment, satellite system interface 46 includes a small LCD screen which displays the location information to individual 44.

In an alternative embodiment, satellite system interface 46 interacts with a global navigation satellite system (GLONASS) instead of GPS. GLONASS, developed by the Soviet Union and maintained by the Russian Republic, is a satellite system consisting of twenty-four satellites spaced around three orbits positioned at approximately 120 degree intervals around the Earth. GLONASS is also capable of locating nearly any object on Earth in which at least three satellites are able to establish a line of sight relationship. In this embodiment, satellite system interface 46 accordingly interacts with GLONASS satellites rather than GPS satellites to determine location information.

Although GPS or GLONASS systems are generally reliable locating systems, both GPS and GLONASS often cannot provide a location of an object or individual within buildings, natural canyons, or urban canyons. Therefore, as described above, personal surveillance system 12 also includes an alternate positioning system 48 to facilitate determination of the location of personal surveillance system 12 when it is located in a building, natural canyon, urban canyon, or other area where satellite system interface 46 is unable to effectively communicate with the GPS or GLONASS satellites. In one embodiment, alternate positioning system 48 includes an inertial navigational unit (INU), an e-GPS unit, or other suitable locating system.

The INU utilizes an initial location input, which is received from satellite system interface 46, to determine subsequent locations of the INU without the use of external information. Typically, the INU includes gyroscopes, accelerometers, a navigational computer, and a clock. In one embodiment, the INU includes three mutually orthogonal gyroscopes and three mutually orthogonal accelerometers. Each of the three accelerometers measures an acceleration component along its respective axis. The three acceleration components are vectorily summed to arrive at one acceleration vector. The gyroscopes collect orientation information that is combined with the summed acceleration vector to provide the total acceleration of the INU in 3-D format. At the end of a predetermined time interval of the clock, the total acceleration is integrated once to get the velocity vector of the FNU. A second integration provides the position vector and, thereby, the position or location of the INU with respect to the initial input location. In one embodiment, the INU provides position information accurate to within approximately 3 feet after utilizing the initial location input to INU for over approximately one mile.

One embodiment of an e-GPS unit utilizes location-enabling chips, which wirelessly interact with multiple cellular towers to ascertain the location of the chips by triangulation and the length of time required to receive a signal from each of the multiple cellular towers. In one embodiment, the e-GPS unit provides position information accurate to within approximately 15 feet outdoors and to within approximately 80 to 165 feet in dense urban environments. In one embodiment, alternate positioning system 48 is an e-GPS interface provided by Cell-Guide of Revovot, Israel.

In one embodiment, alternate positioning system 48 is any other commercially available system known to those of skill in the art and adapted to determine the location of personal surveillance system 12 without utilizing GPS or GLONASS satellites. In one embodiment, alternate positioning system 48 functions to determine the position of personal surveillance system 12 when satellite system interface 46 is unable to ascertain the location of personal surveillance system, i.e. when satellite system interface 46 cannot establish contact with at least three GPS satellites. In another embodiment, alternate positioning system 48 continuously functions to determine the position of personal surveillance system 12 while the system 12 is activated.

As described above, storage device 36 receives information from video system 31, audio system 32, and locating system 34. Storage device 36 stores the information received for later retrieval or viewing. In one embodiment, storage device 36 stores information received with a time stamp indicating the time at which the information was recorded. The time stamp aids subsequent reconstruction of the environment and/or situation for which information was collected.

In one embodiment, transmitter 38 is coupled to storage device 36 via communication link 68, and transmitter 38 is adapted to send responses from monitoring station 14 to storage device 36 for storage and time stamping. In one embodiment (not shown), on/off button 42 and/or panic button 72 are directly or indirectly coupled with storage device 36, which records the time at which the on/off button 42 or the panic button 72 was activated and/or deactivated. As such, storage device 36 contains a record of substantially all information collected during a recorded time interval.

In one embodiment, storage device 36 is any commercially available storage device capable of storing audio, video, and location information and sized to fit on the person of individual 44. In one embodiment, storage device 36 fits on the person of individual 44 in a substantially concealed manner. In one embodiment, storage device 36 is a hard drive or other memory device with removable memory units, such as floppy disks, compact discs, MP3s, etc. In one embodiment, storage device 36 is adapted to store 20–80 GB of information.

Transmitter 38 is adapted to collect information, to modify the information to synthesize a transferable signal, and to transmit the signal to monitoring station 14 via wireless communication path 16. In one embodiment, transmitter 38 is adapted to synthesize a signal for and transfer a signal using one or more of the following communication protocols: WAP, Bluetooth, IRDA, or other communication protocol known to those of ordinary skill in the art. In one embodiment, transmitter 38 synthesizes a signal for transfer over a more conventional means such as a wireless link to a network (e.g., an intranet or internet network, such as the Internet).

In one embodiment, personal surveillance system 12 includes one or more additional components such as a processor, a video screen, a keyboard, a stylus, and/or a blinking light (none of which are illustrated in the attached figures). In one embodiment, this video screen is on a wristwatch-like device. The processor facilitates control of and coordinates the transfer of information between the components of personal surveillance system 12. The video screen facilitates review of the collected information by individual 44. The keyboard or stylus are of a type commercially available and provide an additional interface between personal surveillance system 12 and individual 44. The blinking light, or similar equivalent, signals to individual 44 and to others that personal surveillance system 12 is capturing data regarding the surrounding environment and the location of personal surveillance system 12. In time, after regular use in civilian society, the blinking light may become a warning or deterrent system to prevent predators from committing crimes or wrongful acts to or around individual 44 wearing personal surveillance system 12 due to fear of the consequences of identification in connection with such acts. As such, the blinking light would function in much the same way as a similar blinking light functions in a car to deter thieves from stealing that particular car for fear of activating an alarm system.

FIG. 3 generally illustrates one embodiment of how personal surveillance system 12 is worn on individual 44. Individual 44 supports some or all of the personal surveillance system via a body pack 90, a lapel pin 92 and an ear piece 94. Body pack 90 supports one or more of locating system 34, storage device 36, transmitter 38, battery 40, and on/off button 42. In one embodiment, body pack 90 includes one or more compartments 96 for receiving the components of personal surveillance system 12 and attached to a belt 98, which is removably secured to individual 44.

In one embodiment, lapel pin 92 includes at least one of a camera 100 of video system 31 and a microphone 102 of audio system 32. The components on lapel pin 92 are connected to the components housed in or on body pack 90 via a wire 104. In one alternative embodiment, the components on lapel pin 92 are wirelessly connected to the components on or in body pack 90. Notably, in one embodiment, a portion of video system 31 and a portion of audio system 32 are supported by body pack 90.

In one embodiment, ear piece 94 facilitates attachment of speaker 86 to individual 44. Speaker 86 is connected to the remaining components of audio system 32 on or in body pack 90 via wire 106. In an alternative embodiment, speaker 86 is wirelessly connected to the remaining components of audio system 32. In one embodiment, panic button 72 is contained on a hand-held control 106 for easy and immediate access by individual 44. Panic button is connected to the components supported by body pack 90 via wire 110. In one alternative embodiment, panic button is wirelessly connected to the components supported by body pack 90. Notably, the configuration of the components of personal surveillance system 12 can be attached to individual 44 in a myriad of ways in order to achieve the desired concealment, access, and cost of the particular application.

Referring to FIGS. 1, 2, and 3, individual 44 interacts with on/off button 42 to activate the personal surveillance system 12. Upon activation, transmitter 38 receives information collected by video system 31, audio system 32, and locating system 34. Transmitter 38 synthesizes the information received into the proper format and per the proper protocol to send the information to monitoring station 14 via wireless communication path 16. Upon receipt of information, monitoring station 14 reviews and interprets the information received to determine if individual 44 is in an environment or a situation that requires assistance to be sent to individual 44. If monitoring station 14 determines that individual 44 is in need of assistance, monitoring station 14 sends assistance to the location of individual 44 as ascertained by the information received from locating system 34 via transmitter 38. In one embodiment, if monitoring station 14 determines that individual 44 is in need of assistance, monitoring station 14 contacts third party 18, and third party 18 sends or provides assistance to individual 44 at the ascertained location.

Following activation, information collected by video system 31, audio system 32, and locating system 34 is substantially simultaneously sent to storage device 36. Storage device 36 stores the information for future access and review. In one embodiment, monitoring station 14 can access storage device 36 via transmitter 38 to extract and review previously stored information files. In one embodiment, video system 31 sends low-quality video files to monitoring station 14 via transmitter 38 and sends high-quality video files to storage device 36. As such, monitoring station 14 can accesses the high-quality video files by extracting the files from storage device 36 via transmitter 38. In one embodiment, monitoring station 14 can send audio responses to individual 44 via transmitter 38 and receiver 80. As such, monitoring station 14 can interact with individual 44 by exchange of audio transmissions.

Throughout activation, interaction between panic button 72 and individual 44 places monitoring station 14 on a heightened alert, which necessitates closer review of the information incoming from personal surveillance system 12 worn by individual 44. In one embodiment, interaction between panic button 72 and individual 44 prompts monitoring station 14 to send immediate assistance to individual 44 or to contact third party 18 to send immediate assistance to individual 44.

Subsequent interaction between on/off button 42 and individual 44 causes personal surveillance system to stop collecting, sending, or storing information. In one embodiment, subsequent interaction between on/off button and individual 44 causes battery 40 to stop providing power to the components or personal surveillance system 12. In one embodiment, information previously stored in storage device 36 can subsequently be accessed via temporary connection to a commercial computer processing unit (not shown).

Having capabilities to collect, store, and transmit video, audio, and location script files concerning the environment and/or situation of an individual, the personal surveillance system is useful in providing assistance to any such individual located in a hazardous environment or situation. Similar capabilities permit files recreating the individual's experience to be stored for subsequent access. Such access will allow the environment and situation witnessed by the individual to be verified and will allow the environment and situation to be revisited by other individuals for additional details should it be deemed necessary. In short, the personal surveillance system increases the safety and the accountability of the individual wearing or carrying the system as well as the safety and the accountability of those around him or her.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A personal surveillance system comprising:
   a communication system configured to collect and record communication files from an environment of the personal surveillance system including at least one of audio files and video files;
   a locating system configured to determine a location of the personal surveillance system, the locating system including:
      a satellite system interface configured to determine the location of the personal surveillance system, and
      an alternate positioning system configured to determine the location of the personal surveillance system in at least one situation where the satellite system interface cannot determine the location of the personal surveillance system;
   a transmitter configured to send the communication files and the location of the personal surveillance system to a remote monitoring station; and
   wherein the personal surveillance system is configured to be worn by an individual.

2. The personal surveillance system of claim 1, wherein the communication system includes an audio system configured to collect and record audio files.

3. The personal surveillance system of claim 2, wherein the audio system includes a receiver configured to facilitate communication from the remote monitoring station to the individual.

4. The personal surveillance system of claim 1, wherein the communication system includes a video system configured to collect and record video files.

5. The personal surveillance system of claim 4, wherein the video system includes a flash.

6. The personal surveillance system of claim 4, wherein the communication system further includes an audio system configured to record audio files.

7. The personal surveillance system of claim 1, wherein the satellite system interface interacts with a global positioning system (GPS).

8. The personal surveillance system of claim 1, further comprising a storage device configured to store at least one of the communication files and the location of the personal surveillance system.

9. The personal surveillance system of claim 8, wherein the storage device includes at least one of a hard drive and other type of electronic storage device.

10. The personal surveillance system of claim 1, wherein the alternate positioning system includes an inertial navigational unit.

11. The personal surveillance system of claim 1, wherein the alternate positioning system includes e-GPS.

12. The personal surveillance system of claim 1, further comprising a panic button.

13. A surveillance and monitoring system comprising:
    a personal surveillance system configured to be worn by an individual, the personal surveillance system including:
        a communication system configured to collect and record communication files from an environment of the personal surveillance system including at least one of audio files and video files;
        a locating system configured to determine a location of the personal surveillance system, the locating system including:
            a satellite system interface configured to determine the location of the personal surveillance system,
            an alternate positioning system configured to determine the location of the personal surveillance system in at least one situation where the satellite system interface cannot determine the location of the personal surveillance system, and
            a transmitter configured to send the communication files and the location of the personal surveillance system; and
    a remote monitoring station configured to receive and review the communication files and the location transmitted from the personal surveillance system.

14. The surveillance and monitoring system of claim 13, wherein the personal surveillance system further comprises a storage device configured to store at least one of the communication files and the location of the personal surveillance system.

15. The surveillance and monitoring system of claim 14, wherein the storage device includes at least one of a hard drive and other type of electronic storage device.

16. The surveillance and monitoring system of claim 13, wherein the alternate positioning system includes an inertial navigational unit.

17. The surveillance and monitoring system of claim 13, wherein the alternate positioning system includes e-GPS.

18. The surveillance and monitoring system of claim 13, wherein the personal surveillance system further comprises a panic button.

19. The surveillance and monitoring system of claim 13, wherein the communication system includes a receiver configured to facilitate communication from the remote monitoring station to the individual.

20. A method of surveillance comprising:
    collecting and recording communication files with a personal surveillance system from an environment of the personal surveillance system including at least one of audio files and video files;
    determining a location of the personal surveillance system including:
        determining the location of the personal surveillance system with a satellite system interface if the satellite system interface can determine the location of the personal surveillance system, and
        determining the location of the personal surveillance system with an alternate positioning system if the satellite system interface cannot determine the location of the personal surveillance system; and
    sending the communication files and the determined location from the personal surveillance system to a remote monitoring station.

21. The method of claim 20, further comprising storing at least one of the communication files and the location of the personal surveillance system in a storage device of the personal surveillance system.

22. The method of claim 20, wherein determining the location of the personal surveillance system with a satellite system interface includes the satellite system interface interacting with a global positioning system.

23. The method of claim 20, wherein the alternate positioning system includes an inertial navigational unit.

24. The method of claim 20, wherein the alternate positioning system includes e-GPS.

* * * * *